(12) United States Patent
Drakoulis et al.

(10) Patent No.: US 7,797,719 B2
(45) Date of Patent: Sep. 14, 2010

(54) APPARATUS AND METHOD FOR INTERACTIVE DIGITAL MEDIA CONTENT REQUESTS

(75) Inventors: Niko Drakoulis, Arlington Heights, IL (US); John Karatonis, Chicago, IL (US); Georgios Stoikos, Serres (GR)

(73) Assignee: Akoo International, Inc., Elmwood Park, IL (US)

( * ) Notice: Subject to any disclaimer, the term of this patent is extended or adjusted under 35 U.S.C. 154(b) by 0 days.

(21) Appl. No.: 12/415,096

(22) Filed: Mar. 31, 2009

(65) Prior Publication Data

US 2009/0222864 A1  Sep. 3, 2009

Related U.S. Application Data

(63) Continuation-in-part of application No. 11/186,572, filed on Jul. 21, 2005.

(60) Provisional application No. 60/590,120, filed on Jul. 22, 2004.

(51) Int. Cl.
*H04N 7/173* (2006.01)

(52) U.S. Cl. ............... 725/87; 725/91; 725/98; 725/103

(58) Field of Classification Search ............ 725/74–85
See application file for complete search history.

(56) References Cited

U.S. PATENT DOCUMENTS

| | | | |
|---|---|---|---|
| 4,414,467 A | 11/1983 | Gould et al. | |
| 4,528,643 A | 7/1985 | Freeny, Jr. | |
| 4,553,211 A | 11/1985 | Kawasaki et al. | |
| 4,905,280 A | 2/1990 | Wiedemer | |
| 5,150,817 A | 9/1992 | Livingston | |
| 5,219,094 A | 6/1993 | Labriola | |
| 5,291,554 A | 3/1994 | Morales | |
| 5,323,448 A | 6/1994 | Biggs | |
| 5,339,250 A | 8/1994 | Durbin | |
| 5,355,302 A | 10/1994 | Martin et al. | |
| 5,415,319 A | 5/1995 | Risolia | |
| 5,440,336 A | 8/1995 | Buhro et al. | |

(Continued)

FOREIGN PATENT DOCUMENTS

EP  1370023 A1  10/2003

(Continued)

OTHER PUBLICATIONS

Chinese Patent Office Action Application No. 200580030849.2 Dated Jan. 23, 2009. Applicant is citing the Chinese Patent Office Action and the new reference to Walsh cited therein.

(Continued)

*Primary Examiner*—Joseph P Hirl
*Assistant Examiner*—Mushfikh Alam
(74) *Attorney, Agent, or Firm*—Young Basile

(57) ABSTRACT

A remote user interface transmits a digital media request through a first communication link to a media management control which is coupled by a second communication link to a digital audio-visual playback device for selecting and playing a stored digital media by the playback device. The media management control executes a set of rules applicable to each playback device in determining whether or not a user request will be accepted or rejected for play on a particular playback device.

13 Claims, 8 Drawing Sheets

U.S. PATENT DOCUMENTS

| | | |
|---|---|---|
| 5,445,295 A | 8/1995 | Brown |
| 5,475,740 A | 12/1995 | Biggs, Jr. et al. |
| 5,481,509 A | 1/1996 | Knowles |
| 5,519,435 A | 5/1996 | Anderson |
| 5,521,631 A | 5/1996 | Budow |
| 5,528,282 A | 6/1996 | Voeten et al. |
| 5,629,867 A | 5/1997 | Goldman |
| 5,633,839 A | 5/1997 | Alexander et al. |
| 5,641,319 A | 6/1997 | Stoel et al. |
| 5,644,714 A | 7/1997 | Kikinis |
| 5,647,505 A | 7/1997 | Scott |
| 5,661,517 A | 8/1997 | Budow et al. |
| 5,675,738 A | 10/1997 | Suzuki et al. |
| 5,745,556 A | 4/1998 | Ronen |
| 5,748,485 A | 5/1998 | Christiansen et al. |
| 5,769,269 A | 6/1998 | Peters |
| 5,781,889 A | 7/1998 | Martin et al. |
| 5,794,217 A | 8/1998 | Allen |
| 5,798,785 A | 8/1998 | Hendricks et al. |
| 5,809,246 A | 9/1998 | Goldman |
| 5,831,862 A | 11/1998 | Hetrick et al. |
| 5,848,398 A | 12/1998 | Martin et al. |
| 5,911,043 A | 6/1999 | Duffy et al. |
| 5,914,712 A | 6/1999 | Sartain et al. |
| 5,930,765 A | 7/1999 | Martin |
| 5,945,987 A | 8/1999 | Dunn |
| 5,959,945 A | 9/1999 | Kleiman |
| 5,999,207 A | 12/1999 | Rodriguez et al. |
| 6,067,562 A | 5/2000 | Goldman |
| 6,163,795 A | 12/2000 | Kikinis |
| 6,172,948 B1 | 1/2001 | Keller et al. |
| 6,232,539 B1 | 5/2001 | Looney et al. |
| 6,248,946 B1 | 6/2001 | Dwek |
| 6,269,394 B1 | 7/2001 | Kenner et al. |
| 6,295,555 B1 | 9/2001 | Goldman |
| 6,381,575 B1 | 4/2002 | Martin et al. |
| 6,392,664 B1 | 5/2002 | White et al. |
| 6,397,189 B1 | 5/2002 | Martin et al. |
| 6,507,727 B1 | 1/2003 | Henrick |
| 6,587,403 B1 | 7/2003 | Keller et al. |
| 6,598,230 B1 | 7/2003 | Ballhorn |
| 6,611,654 B1 | 8/2003 | Shteyn |
| 6,628,302 B2 | 9/2003 | White et al. |
| 6,647,417 B1 | 11/2003 | Hunter et al. |
| 6,876,901 B2 | 4/2005 | DiLorenzo |
| 7,143,430 B1 | 11/2006 | Fingerman et al. |
| 7,430,554 B1 | 9/2008 | Heisinger, Jr. |
| 7,577,717 B2 * | 8/2009 | Smith .................... 709/218 |
| 2001/0023403 A1 | 9/2001 | Martin et al. |
| 2001/0039659 A1 | 11/2001 | Simmons et al. |
| 2001/0053996 A1 | 12/2001 | Atkinson |
| 2002/0026500 A1 | 2/2002 | Kanefsky et al. |
| 2002/0032752 A1 | 3/2002 | Gold et al. |
| 2002/0049717 A1 | 4/2002 | Routtenberg et al. |
| 2002/0093921 A1 | 7/2002 | Urs et al. |
| 2002/0113824 A1 | 8/2002 | Myers, Jr. |
| 2002/0119793 A1 | 8/2002 | Hronek et al. |
| 2002/0133562 A1 | 9/2002 | Newman et al. |
| 2002/0147658 A1 | 10/2002 | Kwan |
| 2002/0156896 A1 | 10/2002 | Lin et al. |
| 2002/0194264 A1 * | 12/2002 | Uchiyama et al. .......... 709/203 |
| 2003/0050058 A1 | 3/2003 | Walsh et al. |
| 2003/0056222 A1 | 3/2003 | Iwata et al. |
| 2003/0074219 A1 | 4/2003 | Martin et al. |
| 2003/0100321 A1 | 5/2003 | Rao et al. |
| 2003/0132952 A1 | 7/2003 | Davis et al. |
| 2003/0135424 A1 | 7/2003 | Davis et al. |
| 2003/0139980 A1 | 7/2003 | Hamilton |
| 2003/0172132 A1 | 9/2003 | Lin et al. |
| 2003/0193519 A1 | 10/2003 | Hayes et al. |
| 2004/0001396 A1 | 1/2004 | Keller et al. |
| 2004/0010800 A1 | 1/2004 | Goci |
| 2004/0025185 A1 | 2/2004 | Goci et al. |
| 2004/0028195 A1 | 2/2004 | Leyden et al. |
| 2004/0029598 A1 | 2/2004 | Guggisberg |
| 2004/0030906 A1 | 2/2004 | Marmigere et al. |
| 2004/0030930 A1 | 2/2004 | Nomura |
| 2004/0038691 A1 | 2/2004 | Shin |
| 2004/0039782 A1 | 2/2004 | Reddy et al. |
| 2004/0048628 A1 | 3/2004 | Puccioni |
| 2004/0111749 A1 | 6/2004 | Zhang et al. |
| 2004/0158871 A1 | 8/2004 | Jacobson |
| 2004/0205171 A1 | 10/2004 | Nathan et al. |
| 2004/0218047 A1 | 11/2004 | Goodman et al. |
| 2004/0243482 A1 | 12/2004 | Laut |
| 2005/0021418 A1 | 1/2005 | Marcus et al. |
| 2005/0021421 A1 | 1/2005 | Herman |
| 2005/0022127 A1 | 1/2005 | Meyers et al. |
| 2005/0022244 A1 | 1/2005 | Scheelke |
| 2005/0028197 A1 | 2/2005 | White et al. |
| 2005/0044254 A1 | 2/2005 | Smith |
| 2005/0044568 A1 | 2/2005 | White et al. |
| 2005/0055716 A1 | 3/2005 | Louie et al. |
| 2005/0057538 A1 | 3/2005 | Morse et al. |
| 2005/0060405 A1 | 3/2005 | Nathan et al. |
| 2005/0071881 A1 | 3/2005 | Deshpande |
| 2005/0076376 A1 | 4/2005 | Lind |
| 2005/0076388 A1 | 4/2005 | Morse et al. |
| 2005/0091107 A1 | 4/2005 | Blum |
| 2005/0097619 A1 | 5/2005 | Haddad |
| 2005/0125833 A1 | 6/2005 | Nathan et al. |
| 2005/0132405 A1 | 6/2005 | AbiEzzi et al. |
| 2005/0177853 A1 | 8/2005 | Williams et al. |
| 2005/0278766 A1 | 12/2005 | Benco et al. |
| 2006/0085821 A9 | 4/2006 | Simmons et al. |
| 2006/0107286 A1 | 5/2006 | Connor et al. |
| 2006/0184979 A1 | 8/2006 | Bayrakeri et al. |
| 2007/0094698 A1 | 4/2007 | Bountour et al. |

FOREIGN PATENT DOCUMENTS

| | | |
|---|---|---|
| EP | 1370023 A1 | 12/2003 |
| WO | 9922346 | 5/1999 |
| WO | 0128222 | 4/2001 |
| WO | 0139577 | 6/2001 |

OTHER PUBLICATIONS

European Search Report Dated Jun. 9, 2009; claiming priority from Application No. 05764482.5-1241/1776834 PCT/US2005025749.
Mexican Office Action issued Aug. 14, 2009 and translation and summary from Mexican Patent Attorney.

* cited by examiner

102
Rules

1. Location Preferences
   a. No. Requests Per User
   b. Music Genre
   c. Artists
   d. Songs/Video 2. Queue Length - Max
3. Priority Play Per Rewards Pgm.
4. Artist/Song No Repeat Interval
5. Already in Queue
6. Song/Video Exists on LNS
7. Song/ Approved for Location
8. Force Play - Immediately
9. Out of Order Play Per Promoting

APPARATUS AND METHOD FOR INTERACTIVE DIGITAL MEDIA CONTENT REQUESTS

CROSS-REFERENCE TO RELATED APPLICATIONS

This application is a Continuation-In-Part of co-pending application Ser. No. 11/186,572, filed Jul. 21, 2005, for a "Apparatus and Method for Interactive Content Requests in a Networked Computer Jukebox", which application claims the benefit of the filing date of U.S. Provisional Patent Application Ser. No. 60/590,120 filed Jul. 22, 2004, the contents of both applications incorporated herein in their entirety.

BACKGROUND

The present invention relates, in general, to apparatus and methods for requesting the play of audio/video media from a local area playback device.

The jukebox industry has existed since 1887 when saloon owner Charlie Glass invented the "Nickel in the Slot," giving birth to the amusements industry and spurring the development of the recording industry. This event can also be considered an early inception point of "micro-payment" business models in exchange for a unique service to consumers.

The jukebox industry is now entering its third boom both economically and technologically. The advent of enterprise network jukebox products has made system monitoring, content updates and service management more cost-effective relative to conventional jukebox operations. In addition, sensor and software-based user interface technology has enhanced artist, album and song search features for consumers, providing the ability to browse an unlimited number of content selections via a rich media digital touch-screen.

Digital jukeboxes have recently been developed in order to provide a greater selection of music content relative to conventional CD jukeboxes. The advent of networked digital jukebox systems has enabled options to incorporate hard-disk storage capacity in pay-for-play amusement devices, provide a more efficient means of updating music on a communications network of amusement devices and systematically reduce on-site technician visits. Network digital jukeboxes employ a client server software system that takes advantage of digital technology and the Internet to provide patrons with next generation features and to provide jukebox operators with the ability to centrally manage their jukeboxes via a web portal. The onsite store of media in each jukebox may be periodically revised with new digital media transmitted by the jukebox network server. As a result, network operators can remotely update content, retrieve usage and revenue information, change pricing or play configurations, and check jukebox health statistics.

Similarly, this technology provides patrons with access to content and songs either stored on a local hard-disk or available for download from centralized and/or remote library mechanisms in order to playback the output on the local jukebox.

Nevertheless, several features have carried forward from the earliest machines. One of these features includes the requirement to browse through a selection of songs and select one for play by physically affecting a catalog mechanism located exactly on, and/or inside the jukebox amusement device. A central feature of modern jukeboxes involves sensor and software-based user interface technology located exactly on, and/or inside the jukebox amusement device. This technology has enhanced artist, album and song selection features for consumers, providing the ability to browse a virtually unlimited number of catalog selections via a digital touch-screen. A monetary acceptance device for currency, credit card, or pre-paid billing card, etc., is employed to validate any jukebox request made from a modern touch-screen machine. The request is acted on by the jukebox if the selected media is stored in the jukebox. If not, the request is transmitted from the jukebox to the jukebox network server wherein the music, video or other digital selection is transmitted back to the particular jukebox.

Despite such industry improvements, critical management and relevant usage problems associated with both conventional as well as digital systems have remained unresolved. Furthermore, networked touch-screen jukebox products featuring comprehensive selection and content capacity have spawned potentially adverse economy-of-scale effects for network operators.

Location-based Jukebox song selection is not yet as efficient, concurrently interactive, or personally compelling as it "should" be to address today's competitive realities. A critical usage problem related to conventional systems—and exponentially more vexing of networked digital jukebox products—is that these systems require users to browse, select and order music content in a linear fashion or "one person at a time," thereby limiting the maximum volume of transactions and potentially increasing "dwell" time per user at each jukebox location. Current system designs remain constrained to physical kiosk products coupled to a linear selection and payment-acceptance (i.e. coin) mechanism at the point-of-purchase. The customer must first move within exact proximity of the kiosk, directly face the jukebox interface, input the desired content selection and directly affect payment into the unit to activate the order. In addition, usage data cannot be mined for demographic information and no direct communication channel currently exists for personalized service models or the cross-marketing of related digital products to consumers (i.e. "over-the-air" downloads, targeted promotions or ads).

In the case of networked digital systems, the above described inverse relationships are negatively exacerbated precisely because; i) current product designs have retained the requirement for exact user proximity to the amusement output device even though the user may not always place a song order when browsing current content catalogs, ii) current product designs have increased the search, selection features and catalog capacity available to users, iii) current product designs force "single-user" linear access to the available catalog even though time-to-order is an unpredictable variable across users, iv) current product designs do not harness efficient content ingestion, location updating and on-demand downloading architectures, v) current product designs require installation of multiple kiosk selection devices for multi-zoned entertainment venues, and vi) the selection and output methods are coupled to the enabling payment system (s). This system design paradox potentially creates adverse economic costs for digital network operators who purchase jukebox hardware, license content catalogs, develop distribution relationships, share substantial revenue streams with manufacturers and venue partners, manage coin-collection routes, maintain a large number of devices and manage commercial implementation of critical system and network elements. Furthermore, high costs associated with the production/assembly process of electronic jukebox amusement devices and the total cost of ownership for operators has sapped economies of scale, reduced mass adoption and contributed to the subsequent fragmentation of the industry.

Current industry solutions partially address the limiting usage and operational factors described above by creating enhanced or additional features. Such features include touch-screen browsing and search functionality, credit card payment or priority play mechanisms to entice customer orders and increase revenue opportunities. Although such features offer new options for consumers who can place their order ahead of previous content orders at a price premium, they do not resolve the loss of sales and diminishing returns from linear kiosk usage in general.

Thus, it would be desirable to provide an easier method for selection of content or media on a local area playback device. It would be desirable to provide a method and apparatus that will allow a plurality of users to access the playback selection and playback services concurrently.

SUMMARY

There is disclosed an apparatus and method for interactive content requests in a networked digital audio-visual playback system which enables user requests for selecting a specific digital media playback at a specified playback device location to be implemented wirelessly by the users.

In one aspect, the apparatus provides for content selection in a digital audio-visual playback device capable of playing digital audio-visual media, a media management control coupled in data communication with user interfaces and the digital audio-visual playback device for controlling a digital media transfer to the digital audio-visual playback device.

In another aspect, a method for content selection in a networked digital audio-visual playback device comprises the steps of:

storing digital media in a memory;

generating a digital media content request by a user interface remote from a digital audio-visual playback device identifying one of a digital audio-visual playback device and a selected stored digital media for play by the identified digital audio-visual playback device;

transmitting the digital media content request through a communication link to a control; and transmitting the identified digital media by the control to the digital audio-visual playback device for play of the identified digital media by the digital audio-visual playback device.

The media management control accepts or rejects the identified media in each user request based on rules of play for each playback device. Global rules of play are established for all media management controls. A local set of rules based on the global set of rules of play are executed by each media management control upon receipt of a user request. The media management control accepts the requested digital media for play on a playback device if the requested media meets all of the local rules of play. Alternately, the media management control rejects the requested digital media if the requested digital media does not meet all the local rules of play for a particular playback device.

A rule subset may be provided and executed by a media management control for a particular playback device. The rule subset can be based on a variably occurring event, such as a time of day, a day of week, a day or dates of the month, special events, etc.

When the variable event occurs, the rule's subset is applied by a media management control to all subsequent user requests. The rule subset may vary any of the global rules or the local rules applicable to a particular playback device during a length of time of the event.

The present interactive digital content request apparatus and method uniquely enables digital media played through a digital audio playback device, such as a digital jukebox, to be remotely and wirelessly selected by a user. This eliminates the need for the user to move to the location of the jukebox and input a selection via the normal keyboard, mouse, and/or touch screen display provided with prior jukeboxes. The entire digital media selection process can be done remotely and wirelessly through an interface user.

BRIEF DESCRIPTION OF THE DRAWING

The various features, advantages and other uses of the present invention will become more apparent by referring to the following detailed description and drawing in which.

DETAILED DESCRIPTION

The present invention provides an interactive jukebox request system in a communication network for selecting content events and/or songs for output by a local digital audio-visual playback device, such as a digital computer jukebox from a mobile communication device.

The term "audio-visual" as referred to herein to encompass audio data, such as music, spoken words, etc., visual data, such as movies, video games, and other visual images, including text, and combinations of audio and visual material simultaneously output to an audio-visual playback device. Thus, it will be understood that although music and music identification data are referred to hereafter, it will be understood that this is by way of example only.

Further, it will be understood that the use of the term digital media will encompass both audio and/or visual data as well as audio and/or visual data identification, such as author name, title, length of play, type of media, etc.

Further, any digital audio-visual playback device may be employed. It will be understood that the following description of one such device as being a digital computer jukebox is also by way of example.

Figures 1, 9:
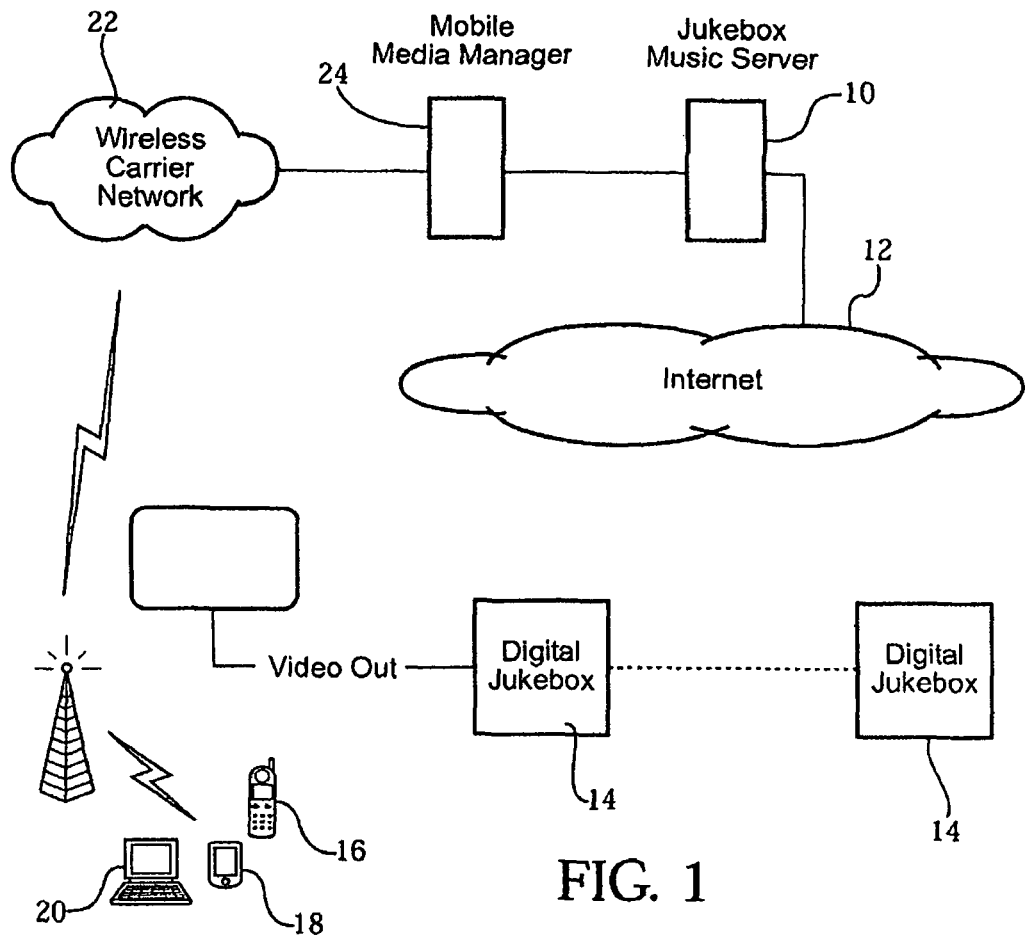
FIGS. 1-5 are block diagrams of different aspects of the present digital media content request apparatus.
FIG. 9 is a pictorial representation of a global set of rules for play of a digital media content request by the media management control.

In one aspect shown in FIG. 1, a central management system manages a communication link to mobile stations in a computer jukebox network and translates packets in the payloads of SMS, MMS or Internet messages containing specific content selections created by a mobile user located remote from a jukebox. A central Mobile MEDIA MANAGER (MMM) 24 implemented as a feature of communication link 22, such as a carrier network, which may be implemented as a Short-Message-Service-Center (SMSC) 22 and Mobile-Multimedia-Service-Environment (MMSE) or an Internet network, manages concurrent mobile-originating transmissions representing mobile user selected content or media, such as song selections, designated for public performance from one of a plurality of computer jukeboxes 14.

At least a portion of the carrier network 22 may include wireless communication. The central MMM 24 addresses a host jukebox network server via HTTP, for example, that maintains a master set of compressed digital data or media representing a plurality of songs, song associated graphics, song identity information, and jukebox venue location identification codes, for example. The MMM 24 receives mobile selection information based on the user request from the carrier network 22 and polls the jukebox network server 10 connected to a plurality of digital jukeboxes 14 and capable of storing a subset of the master set of digital media to obtain an updated list of registered jukeboxes 14, to determine content availability from a list of content or music residing on the jukebox network server 10 and/or the jukeboxes 14, and to check the validity of the user request.

Specific content selections initiated by a mobile user 16, 18, 20 including content event or song identity, venue location register and service priority queuing to a specific computer jukebox apparatus 14, are received at the central MMM 24 to provide audio or video output in the service, venue or jukebox 14 where the mobile user initiated the selection. The MMM 24 interfacing the carrier network 22 and the jukebox network server 10 operates on a scheduled peer session interval to authenticate users, determine the value of the billing event and handle submission of jukebox 14 requests. The MMM 24 differentiates the value of the jukebox network carrier requests to the billing entity. The MMM 24 communicates to the core network carrier 22 whether a mobile user, i.e., wireless carrier, SMSC, etc., should be billed only after the MMM 24 has verified that a corresponding jukebox 14 is operating, the MMM 24 has verified that the master or the subset of the master set of digital media is available, and the MMM 24 has forwarded the user request designated as a "standard" or "priority" request to be placed in the jukebox network server 10 queue.

In FIG. 1, a digital jukebox network is illustrated, by example, as including a jukebox network server 10 having a host processor which communicates via HTTP or other data transmission formats through a wireless communication system, such as the Internet 12, hardline, etc., to at least one or a plurality of digital audio-visual playback devices, such as digital jukeboxes 14. The communication format to each jukebox 14 can be via any transmission protocol, such as ADSL, cable modem, WCDMA, UMTS, or LMDS or other data communication protocols.

According to this aspect, a mobile communication device or user interface, typically a mobile wireless communication device, such as a cellular telephone 16, a PDA 18, or a computer 20, as non-limiting examples only, communicates with the communication network 22. The communication link or network 22 may be any type of communication provider either wireless or not, such as, but not limited to, Wi-Fi, Internet, direct cable connection, Ethernet, GSM, GPRS, UMTS, EDGE, Token ring etc. Such a network 22 may have as a subset, a Short Message Service Center (SMSC) adapted for short text messaging, an Internet protocol having displayable drop down menus allowing user input selections, or a multimedia service (MMS) providing audio and graphic data.

Although the following example of a wireless content request pertains to a short message service using an SMSC subset of the wireless carrier network 22, it will be understood that similar data input protocols or media selection, such as through drop down menus, may also be employed.

An appropriate SMS address, such as "1414" for example, is entered by the user through the communication device 16, 18, or 20 to identify the MMM 24 service. Text messages formed of UNICODE or ASCII characters are then input by a user through the user interface 16, 18, or 20 to identify the digital media selection and other related play features, such as premium play, immediate play, etc. For example, a text message of "S AB123" can be input by a user through the communication device 16, 18 or 20. The first character, labels "S", by example only, is the type of media content. By example only "S" identifies a song. "V" would identify a video. "PS" would identify a priority play of a selected song. "PV" would identify a priority play of a video. The characters "AB" identify the location of the local jukebox 14. The alphanumeric characters "123" identify a particular media selection, such as a particular song. This information is obtainable from a list provided to the user at the local jukebox 14 venue.

These signals are transmitted to the SMSC where the user ID is validated. The location of the digital playback device or jukebox 14, media selection, and play feature data are transmitted from the SMSC to the MMM 24 by hard wire and/or wireless communication. The MMM 24 receives the selection information from the SMSC and communicates with the jukebox network server 10 to determine the availability of the selected jukebox 14. When the server 10 has verified the corresponding jukebox 14 is operating and available to play the selected digital media, the MMM 24 sends a signal to the SMSC to bill the user for the SMS message including any premium play billing. The SMSC may then request a third party, such as, but not limited to, a bank, a credit card company, a mobile operator, etc., to debit the user account for the amount of the services procured. Other methods of payment may include m-wallet (mobile wallet), prepaid cards etc.

At the same time, the MMM 24 sends the user request along with play criteria, such as a standard, recommendation or priority request, to the server 10. The server 10 then communicates via the Internet 12 to the selected jukebox 14 to implement the digital media selection at any premium or standard schedule.

It will be noted that the transmission of the digital media selection signals from the server 10 to the selected jukebox 14 can also include the entire selected digital media, or simply a signal to the jukebox 14 to play a particular digital media already stored in the memory of the selected venue jukebox 14.

The MMM 24 is also capable of sending a message through the SMSC to the user 16 thanking the user for making the selection. This will confirm that the selection has been implemented. At the same time, the message to the user 16 can include other messages, such as an offer to buy the selected song or video at a particular price or the ability to purchase or download as wall paper to the user 16 pictures of the artist performing the selected song or performing in the selected video.

Figure 2:
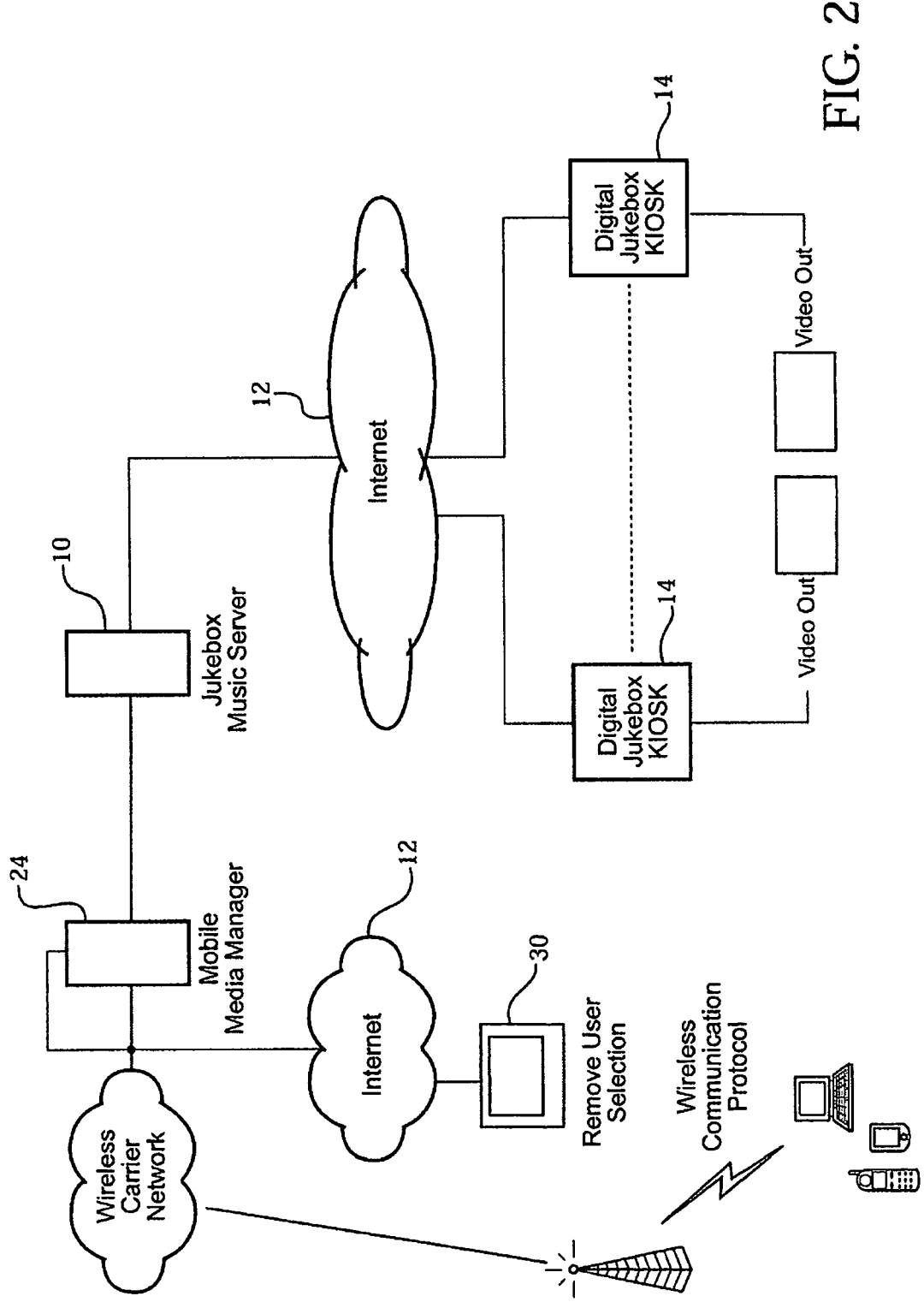

Referring now to FIG. 2, there is depicted another aspect of the apparatus shown in FIG. 1. In this aspect, a remote user content selection processor 30 can communicate through a global communication network, such as the Internet 12, to the mobile media manager 24. This enables a remote user to send dedications, digital media selections, etc., for the benefit of other users located in the proximity of a specific playback device or jukebox 14.

Figure 3:
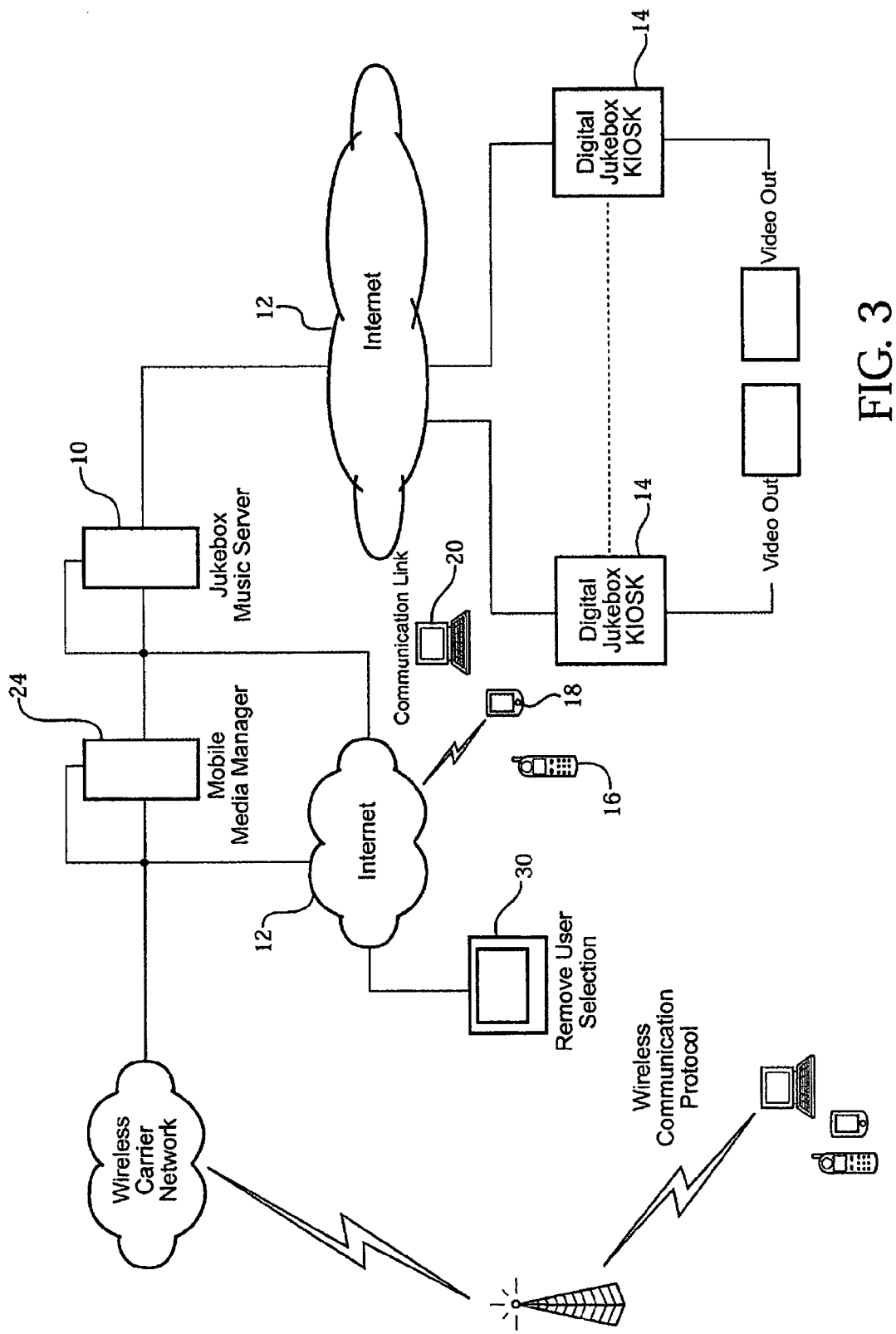

As shown in FIG. 3, the remote user content selector 30 is further modified to provide communication through the Internet 12 to either or both of the mobile media manager 24 and the music server 10. Wireless communication devices 16, 18, 20, etc., may also communicate through the Internet 12 to either or both of the mobile media manager 24 or the music server 10 to provide digital media content selection and playback for other users located in the proximity of a selected jukebox 14.

Figure 4:
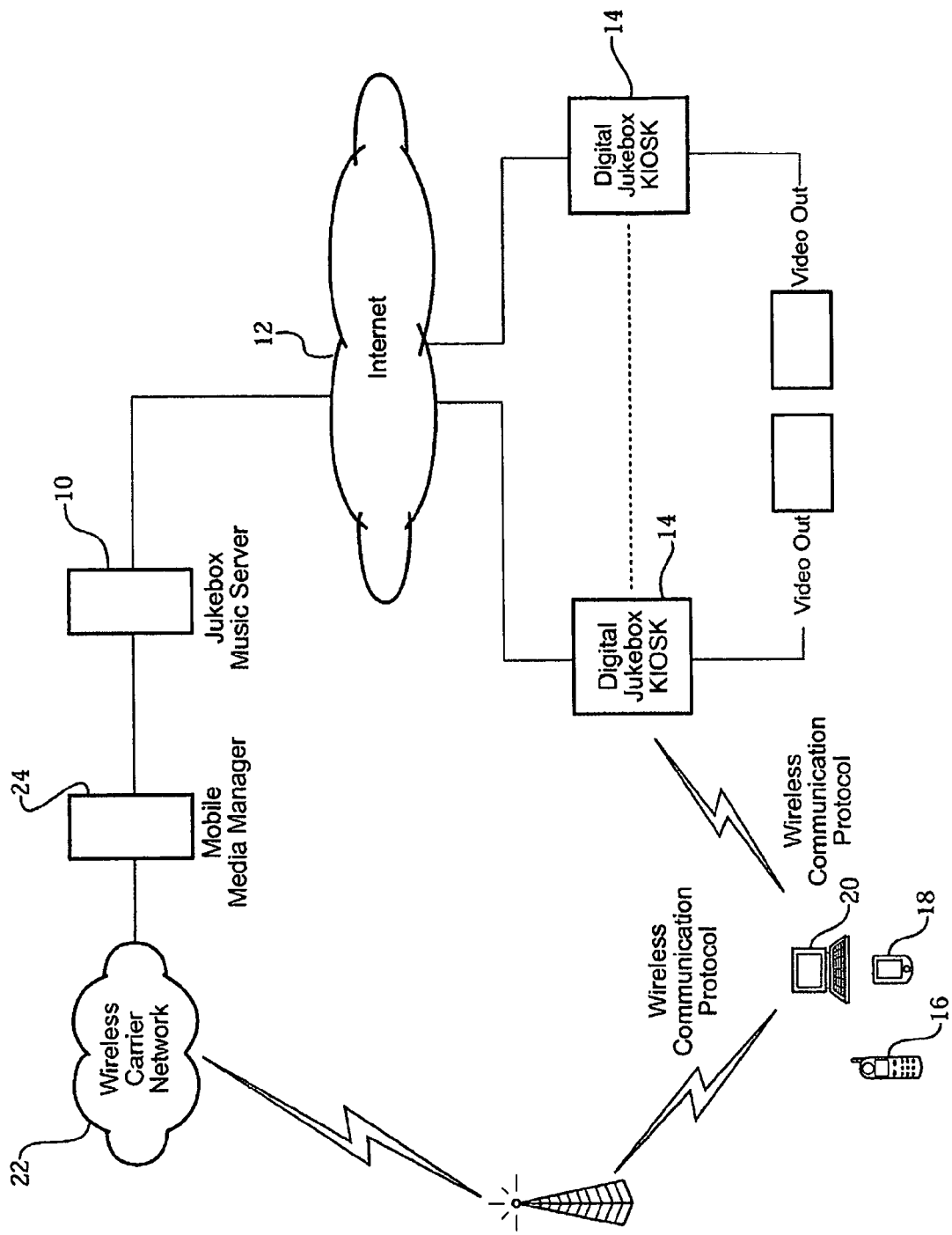

In the aspect shown in FIG. 4, the remote user interface devices 16, 18, or 20 can wirelessly communicate directly with a jukebox 14, using Bluetooth, Wi-Fi, infrared, radio frequency signal, light signal, laser, etc., within communication signal range of the user interface devices 16, 18, or 20. The user interface device 16, 18, or 20 may request an update to the digital media content catalog from the jukebox 14. The jukebox 14 requests the catalog from the jukebox music network server 10 and forwards it to the specific user interface device 16, 18, or 20. If communication with the jukebox network server 10 fails for any reason, the jukebox 14 forwards its own digital media content catalog to the user interface device 16, 18, or 20.

In use, the user selects a specific digital media for playback. The user's interface device 16, 18, or 20 forwards the digital media content request to a jukebox 14 in its vicinity. If there is not a jukebox identification or "ID" in the user request, then it is assumed that the target jukebox 14 for playback is the jukebox 14 that received the user request.

The jukebox 14 then contacts the MMM 24 in order to validate the user. If successful, the jukebox 14 attempts to honor the user request to play the selected content. If playback is successful, the jukebox 14 communicates to the MMM 24 via the jukebox network music server 10 to indicate that the user needs to be billed and informs the user about the selection completion. If there is any error during this process, the jukebox 14 notifies the user directly of the error.

If there is a jukebox ID in the request (different from the one that received the digital media content request), then this request is forwarded to the MMM 24 which acts on it as if it had received the request from any other source. The selected digital media is then output from the jukebox 14 from a media storage in the jukebox 14 or via a download from the Internet 12 and the jukebox music server 10.

In another aspect, a seamless digital audio-visual apparatus or "seamless" jukebox 40 is provided in one or more locations. Some or all of the seamless jukeboxes 40 may include a video output feed 42 to a video display device, such as a TV, monitor, or projector 44. An audio output 46 may also supplied from each seamless jukebox 40 to an audio output playback device, such as one or more speakers 48.

The audio-visual apparatus or seamless jukebox 40 simply comprises a music server coupled to the Internet 12 and an audio or video output device 48 or 46, respectively, which is capable of generating audio sounds and/or visual images as in Internet download. In this aspect, there is no physical jukebox 14 within communication range of the user.

In this aspect, the digital media content is stored in a memory storage or database 50 and accessed by the mobile media manager (MMM) 24 in response to a user request transmitted through the carrier network 22 to the MMM 24. The selected digital media or content is then transmitted by the MMM 24 through the global communication network or Internet 12 to the specified jukebox 40 for output to the user.

The user can browse the digital media content catalog only through the MMM 24. This aspect eliminates the requirement to have a physical jukebox in a particular location along with the associated touch screen, keyboard, track ball, mouse, etc. Once the physical jukebox 14 is removed from a particular location, the need to handle currency or money for each selection is also eliminated thereby simplifying and automating the digital media content selection process.

Figure 5:
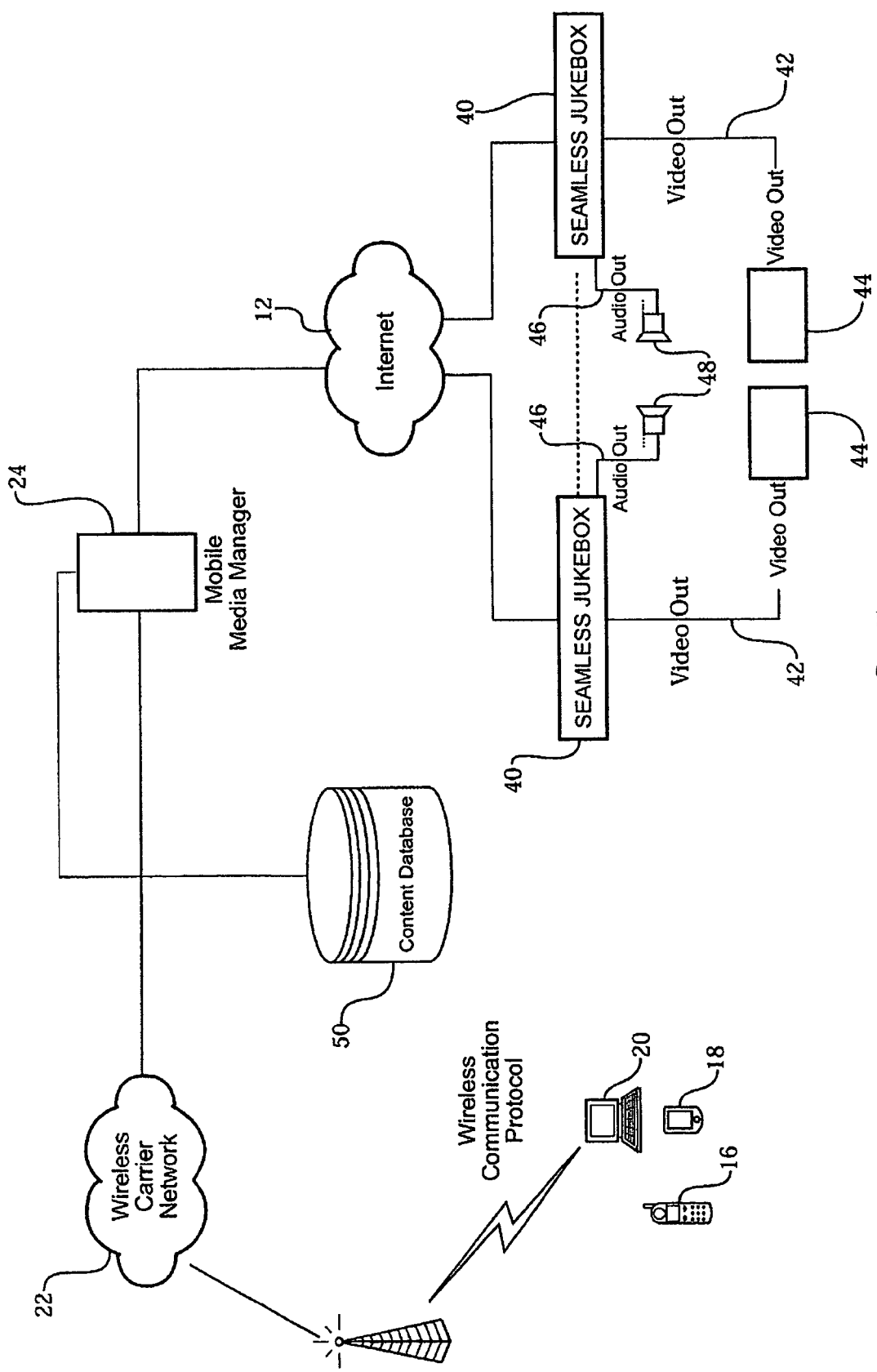
Figure 6:
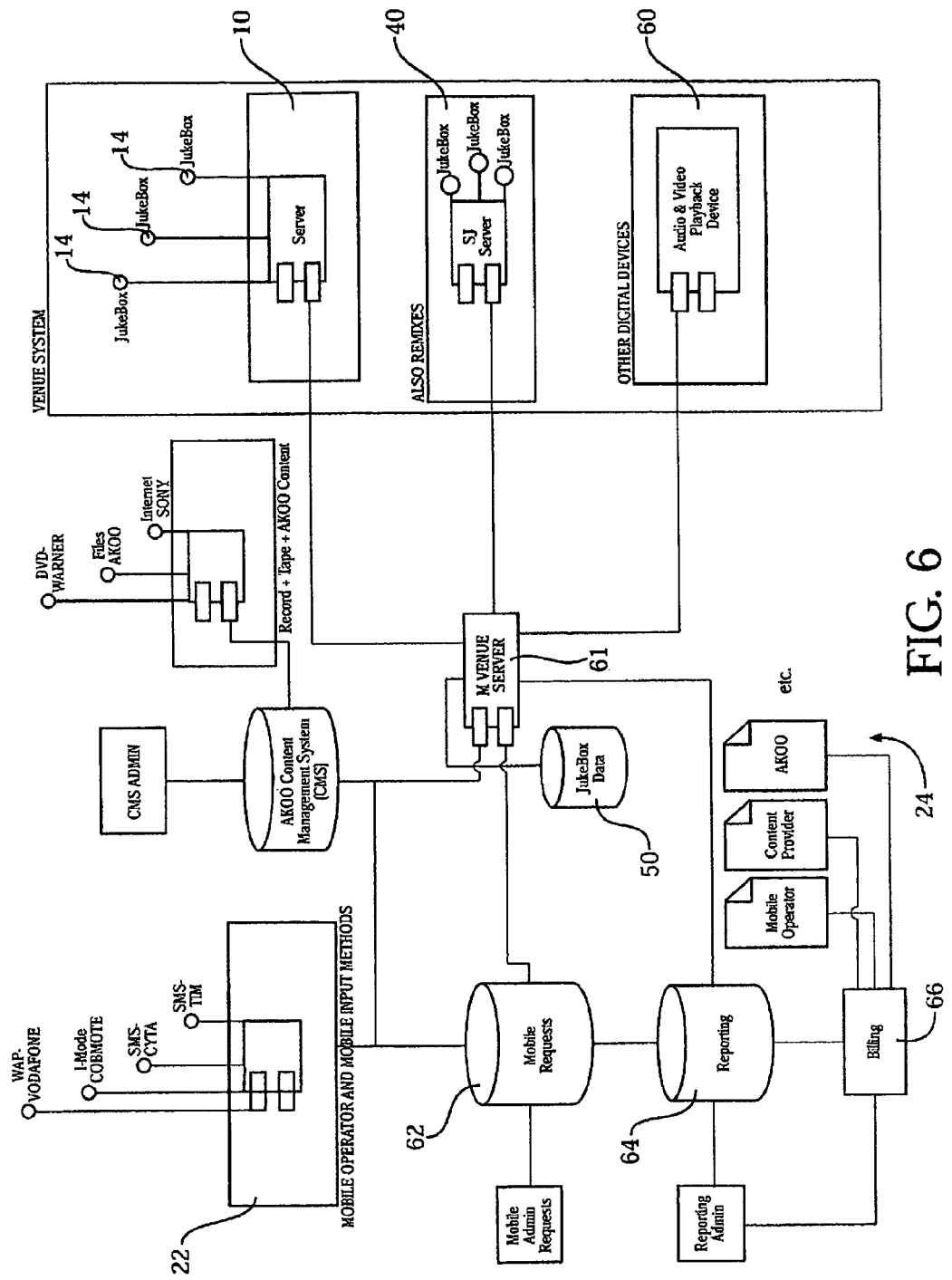
FIG. 6 is a detailed block diagram of the apparatus shown in any of FIGS. 1-5.
Figure 7:
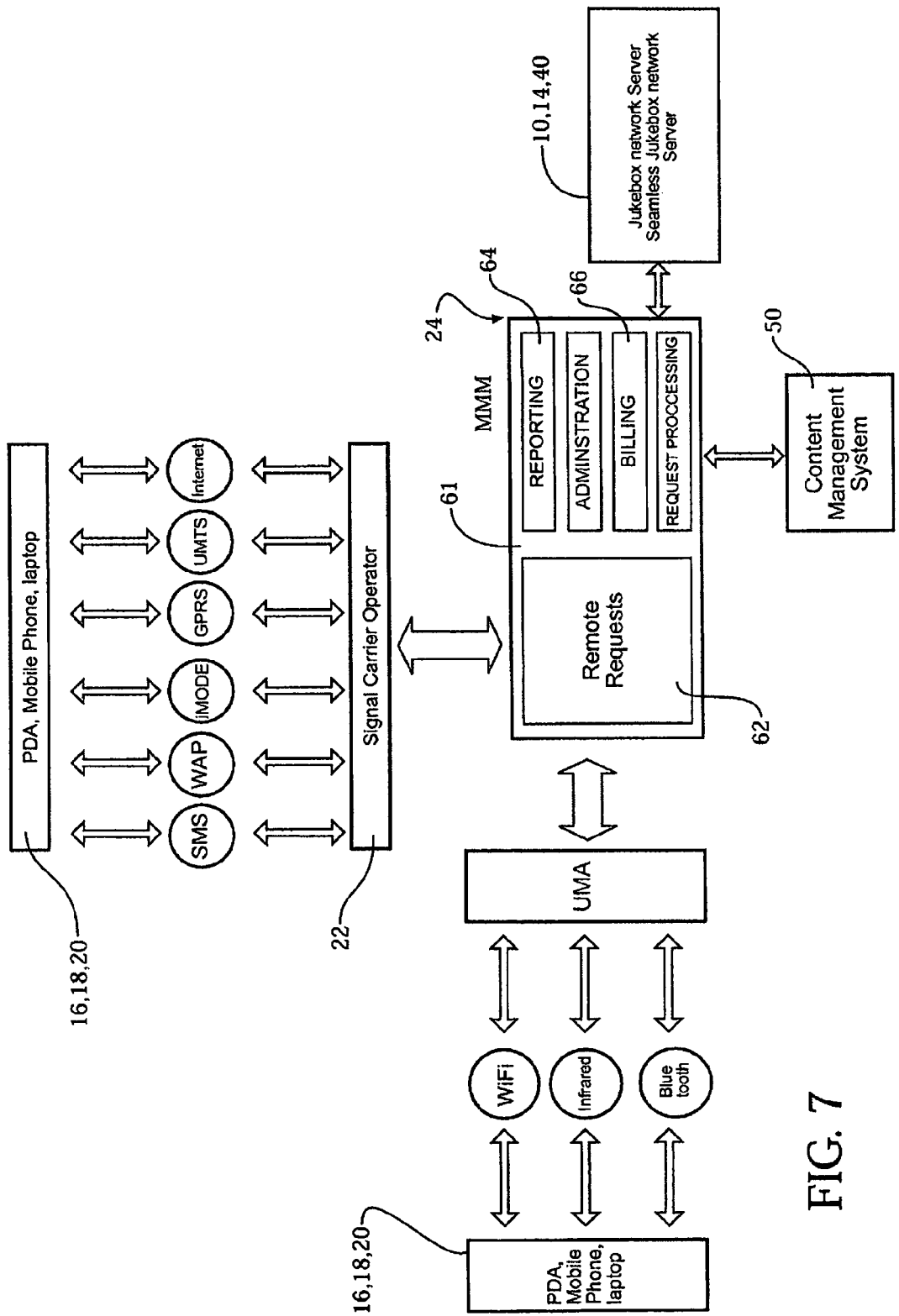
FIG. 7 is a detailed block diagram of the mobile manager shown in FIGS. 1-5.

FIGS. 6 and 7 depict a block diagrams of the major components of the control means or mobile media manager 24 used with any of the different aspects shown in FIGS. 1-5. The MMM 24 includes a so-called m-Venue server 61 which communicates with the music server 10, any of the seamless jukeboxes 40 as well as other audio and video playback devices 60.

FIG. 7 also depicts the transmission or communication of digital media selection signals from the user interfaces or devices 16, 18, and 20 through the signal carrier network 22 as described above in conjunction with FIG. 1, through the Internet 12 as shown in conjunction with FIG. 3 or directly to a digital jukebox 14 or 40 as shown in FIG. 4 or 5. The MMM 24, as described above, can receive a remote content or digital media selection signal from any source. The MMM 24 then checks the selection for validity, processes it, stores it in a database, and forwards the request to the network server 10 in the aspect shown in FIG. 1 or directly to the jukebox 14 in other aspects.

The server 10 or jukebox 14, 40, receives the signal from the MMM 24 and tries to the place the request to the jukebox 14, 40, etc. If this is successful, the server 10 then replies with a success message to the waiting MMM 24. If for any reason there is a failure in the request process, such as the jukebox 14 not responding, the transmission network is down, etc., the server 10 replies to the MMM 24 with a failure message along with the reason of the failure. Once the MMM 24 has received an answer to the remote content selection signal, the MMM 24 records the answer in the database and informs the user with the result of his request.

A user request from any of the mobile user interface devices 16, 18, and 20 is communicated through the network 22 to a mobile request control means 62. The user request is then communicated to the m-Venue server 61 for digital content selection at a specific digital audio-visual playback device or jukebox 14, 40, etc., or in the jukebox music server 10 which transmits the digital media selection to the individual jukeboxes 14, 40, etc., or from the content database 50 which is then transmitted by the MMM 24 directly to the jukeboxes 14, 40, etc.

Each user request is also forwarded to a reporting module 64 which is in communication with the m-Venue server 61 to record each user request and the validation of a successful digital selection. The reporting module 64 communicates with a billing module 66 which suggests the fee for each user request.

The MMM 24 can operate to accept or reject a request from a user interface 16, 18, or 20. In a typical user request from a user interface 16, for example, the request includes an identifier specifying at least one of a playback device for execution or play of the requested digital media, and an identifier for one particular digital media. As described in the previous aspects, the user request from the user interface 16, 18, or 20 is transmitted through the first telecommunication link, such as the wireless carrier network 22, to the mobile media management (MMM) 24. The MMM 24 is programmed with one or more algorithms in a control program which determines whether each user request will be accepted or rejected for play or transmission to one or more playback devices which may be specified by the user in the user request.

Figure 8:
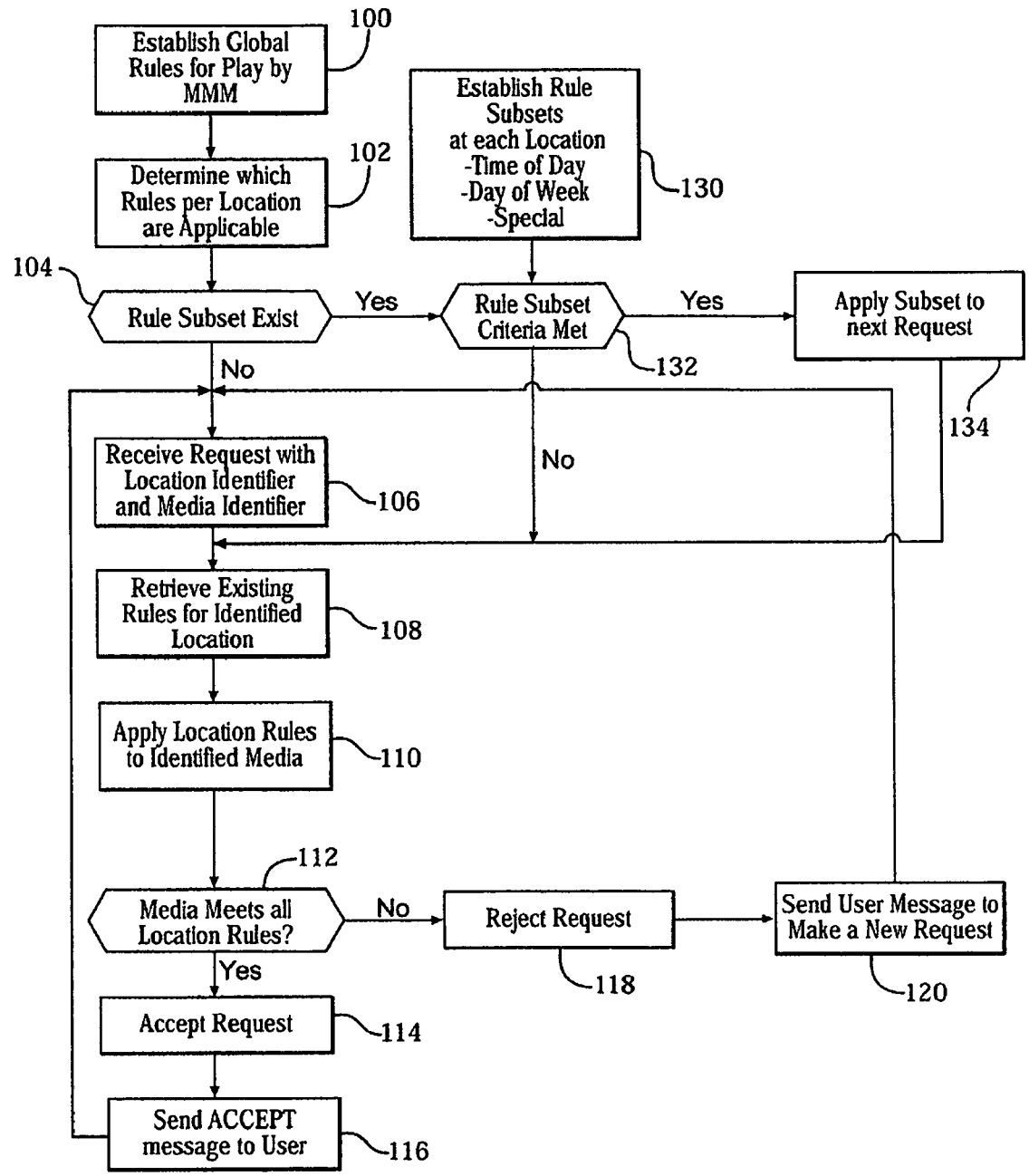
FIG. 8 is a flow diagram depicting the operation of a digital media content request apparatus.

As shown in FIG. 8, global rules are established in step 100 for use by each MMM 24. An example of the global rules is shown in FIG. 9. The order of the rules is not necessary as all of the rules are established for each MMM 24 and will be executed by the MMM 24 in any order until all of the rules applicable to a particular location or playback device 14 have been met for each request.

Rule number one concerns location preferences. The location preferences for example, may include the maximum number of allowable requests from one user within a set time period or consecutively. This allowable number of requests may be disregarded if no requests from other users are received by an MMM 24 between successive requests by the one user who has recently made other requests.

Another location preference may be the music genre or style which is allowed at the location of a particular playback device or jukebox 14. The genre may be broad music or video categories, such as rock, country, jazz, blues, adult, rap, etc., and/or movie genres such as action, comedy, drama, cartoon, music, etc.

Likewise, media from certain artists may be also set as a location preference. Additionally, certain songs or videos associated with an allowable artist may be set as a location preference as being acceptable at that location.

The location preferences enables a proprietor of a particular playback device or location to establish preferences in accepting user requests based on the type of music the proprietor of the playback location wishes to allow in the location, as well as the artists and songs or videos by or related to an artist.

The second rule determines maximum length of a queue of pending user requests which have been accepted for play of digital media by one media playback device 14, but not yet executed by the playback device 14. For example, a particular playback device 14 may set to have a maximum queue length of 15 songs or videos thereby allowing no more than 15 songs or videos to be assigned to a queue for pending play at any one time. This assures a user that his or her request will be played within a reasonable amount of time. When the maximum queue length is met, any further user requests will be rejected until the queue length falls below the preset maximum queue length.

Rule number three allows a priority play of a user request based on a user profile or a user rewards program. The rewards program may be similar to airline frequent flyer miles in that frequent user may be allowed a priority play of the user request based on the preset number of prior requests they have sent to a particular playback device 14. The priority play may be set by a particular location 14 to be "immediate" as soon as the request is received, even if it interrupts the play of an existing song or video, "next" or at the immediate end of the currently playing media on the playback device 14, or at another priority preference which does not place the priority play request at the end of an existing queue, Rule number four allows a location to set a no repeat interval for a particular artist or a particular song. This prevents one or more users from monopolizing the playback device 14 for repetitious play of the same digital media. The no repeat interval can be any amount of time set by a particular location, such as 30 minutes, 60 minutes, 2 hours, etc.

Rule number five enables the MMM 24 to check if the digital media specified in a current user request has already been requested by another user and is currently pending in the play queue. If the current media is already the pending queue, the MMM 24 merely sends an acknowledgment message to the user who sent the last request for the same media indicating that his or her request has been acknowledged and will be played. The media specified in the request will not, however, be played a second time by the MMM 24 as it is already in the queue, even though it may have been requested by a different user.

Rule number six allows the MMM 24 to check if a requested digital media, such as a song, a video, etc., exists on the jukebox server 10, or in the memory associated with the jukebox server 10 or the digital jukebox 14.

Rule number seven causes the MMM 24 to check if a song or video requested by a user has been approved for a specific location of a playback device, such as the jukebox 14. As the MMM 24 and the jukebox server 10 may be connected to a plurality of playback devices or digital jukeboxes 14 which may be located in different locations, even though the locations may be in the same vicinity or building, rule number seven allows the MMM to accept a user request for a certain digital media only if the media is approved by the location proprietor for play on the playback device 14 selected by the user. In this manner, a song or video segment which may be approved by a location proprietor for play in one part of a location or at one location may be rejected and denied play by the MMM 24 at a different location due to the acceptability determined by the location proprietor for the particular media and the patrons at the playback location.

Rule number eight enables the MMM 24 to execute a force play of a user request in which the user request is immediately played. As with the priority play of rule number three, the force play, although typically occurring immediately upon acceptance of a user request, even if it interrupts a currently playing song or video, may also be delayed until the currently playing song or video is completed.

Rule number nine enables the MMM 24 to allow an out of order play for promotions, first time users of the media selection apparatus, etc. The out of order play merely inserts a special user request meeting the promotion conditions at the head of the queue next in line for play by the playback device 14.

Referring back to FIG. 8, in step 107, a determination is made by the programmer of the MMM 24 and/or the proprietor of a location of a playback device 14 as to which of the global set of rules described above and shown in FIG. 9 will apply to each location of a playback device, such as a digital jukebox 14, as a local set of rules. This can be a simple yes/no for each of the global rules 1-9 shown in FIG. 9. This enables a playback device proprietor to set specific rules for each playback device location thereby allowing for differences in music and video taste, clientele, etc., between playback locations.

Step 104 is a determination of whether or not a rule subset exists. As the rule subsets will be described in detail later, it will be assumed, for now, that this determination yields a "no". Next, in step 106, the MMM 24 determines whether it has received a user request with a location identifier and/or a digital media identifier. Upon receipt of a request in step 106, the MMM 24, in step 108, retrieves the existing rules set for the particular playback location in step 102, or as modified by a rule subset as described hereafter. The MMM 24 applies the local rules in step 110 to the media identified in the user request. Only when the identified media in a user request meets all of the existing local rules for a particular playback device 14 or location in step 112, does the MMM accept the user request in step 114 and initiate transmission of the digital media to the identified playback device 14. The MMM 24 may also send an "accepted" message to the user in step 116.

Referring back to step 112, if the MMM 24 determines that a particular requested media does not meet one or more of the existing location rules, the MMM 24 rejects the request in step 118 and sends a message to the user to make another request in step 120.

Optional rule subsets may be established in step 130 for each playback location 14. The rule subsets may be modification of one or more of the global rules shown in FIG. 9, and/or a modification of which of the global rules 1-9 are applicable to a particular playback location 14 as local rules. In addition, the rule subsets may cause a change in one or more variables in certain of the rules 1-9, such as the number of allowable consecutive requests by a user, the allowed music genre for a particular location, the artist and artist songs and/or videos which are playable at a particular location, the maximum queue length, the no repeat interval for an artist or particular artists' song, etc. Any of the local rules 1-9 may be turned off, such as the rules for priority play, play rewards, user requests, which songs or artists are approved for a location, a forced play, an out of order play for special promotions, etc.

The rule subset may be applied at the occurrence of variable or specific events, such as at a specific time of day, on a particular day of a week, on a particular date in a month, special events, such as a sporting event, etc. This enables the MMM 24 to be adaptive to changing clientele in a particular playback device 14 location.

The rule subsets also enable a proprietor of a playback location to adopt different rules to favor changing clientele, such as a more predominately female crowd at one time of the day and a more predominately male crowd at another time of the day. Depending on the time of day, the music genre, type of artist, artist songs and videos, no repeat interval, etc., may be managed.

By way of another example, one or more days of the week, such as every Wednesday, or certain times within certain days of the week, such as every Wednesday night between six p.m. and midnight, a rule subset may be established to go into effect at a particular playback location in which the music genre, artist and acceptable artist songs and videos are changed to suit a particular theme, such as country night, jazz night, etc.

As shown in FIG. 8, the MMM in step 104 determines whether a rule subset exists. If the answer is yes, the MMM 24 determines if the rule subset criteria, such as time of day, day of week, special event occurrence, etc., is met. If the rule subset criteria are not met, the MMM 24 will implement the applicable local rules set for a particular location as described above for step 108. Alternately, if the rule subset criteria are met in step 132, the MMM 24 will apply the rule subset in step 134 as the applicable rules upon receiving the next user request.

What is claimed is:

1. A method for content selection of digital media stored in a memory coupled to a digital media processor and playable on a digital audio-visual playback device comprising the steps of:
   providing a first communication link between a user interface and a media management control wherein the media management control is distinct from the digital media processor;
   providing a second communication link between the media management control and a digital media processor coupled to a memory for storing and retrieving digital media, the digital media processor coupled in communication with at least one digital audio-visual playback device;
   transmitting a digital media content request from the user interface remote from the playback device through the first communication link to the media management control, the request including at least a digital media identifier;
   in response to the digital media content request from the user interface, the media management control managing the execution and the manner of execution of the digital media specified by the digital media identifier through the second communication link on the at least one digital audio-visual playback device by:
   the media management control communicating with the digital media processor to determine the availability of the playback device specified in the digital media content request from a user interface;
   the media management control accepting or rejecting the identified media in each user request based on rules of play for each playback device by applying at least one of the rules of play to the requested digital media at the location of the at least one playback device, the rules of play including
   maximum queue length;
   priority play based on a rewards program;
   determining if a requested digital media is available for play on the at least one playback device;
   determining if a requested digital media is approved for the at least one playback device;
   immediate forced play of a digital media request; and
   out of order play in response to special conditions;
   accepting the requested digital media for play on the playback device if the requested digital media meets the at least one applied rules of play;
   rejecting the requested digital media if the requested digital media does not meet the at least one applied rules of play for the at least one playback device; and
   if the request is accepted initiating transmission of the selected digital media by the digital media processor to the at least one digital audio-visual playback device for play of the selected digital media by the digital audio-visual playback device.

2. The method of claim 1 wherein the step of transmitting the digital media content request through the first communication link further comprises:
   forming the first communication link to include at least a wireless communication portion.

3. The method of claim 1 wherein the step of transmitting the digital media content request through the first communication link further comprises:
   forming at least a portion of the first communication link to include the Internet.

4. The method of claim 1 wherein the step of communicating the identified digital media to the digital audio-visual playback device further comprises the step of:
   transmitting the acceptable digital media over the Internet to the digital audio-visual playback device.

5. The method of claim 1 further comprising the step of:
   establishing a global set of rules for play by the media management control for all playback devices.

6. The method of claim 5 further comprising the step of:
   establishing a rules subset applicable by the media management control for each playback device.

7. The method of claim 6 further comprising the step of:
   allowing variably selectable changes to the rules subset.

8. The method of claim 5 further comprising the steps of:
   establishing at least one variably applicable rules subset; and
   the media management control applying the rules subset when a selected event occurs.

9. The method of claim 8 wherein:
   establishing the variable event as at least one of a time of day, a day of week, a date of month and a special event.

10. The method of claim 8 wherein:
    the time of day has distinct start and end times.

11. The method of claim 1 further comprising the step of:
    the media management control sending an acceptance or rejection message to the user in response to a user request corresponding to the decision by the media management control to accept or reject the play of a user requested identified media on the at least one playback location.

12. The method of claim 8 wherein:
    the rules subset includes a modified set of global rules.

13. A method for content selection of digital media stored in a memory coupled to a digital media processor and playable on a digital audio-visual playback device comprising the steps of:

prov150ing a first communication link between a user interface and a media management control wherein the media management control is distinct from the digital media processor;

providing a second communication link between the media management control and a digital media processor coupled to a memory for storing and retrieving digital media, the digital media processor coupled in communication with at least one digital audio-visual playback device;

transmitting a digital media content request from the user interface remote from the playback device through the first communication link to the media management control, the request including at least a digital media identifier;

in response to the digital media content request from the user interface, the media management control managing the execution and the manner of execution of the digital media specified by the digital media identifier through the second communication link on the at least one digital audio-visual playback device by:

the media management control communicating with the digital media processor to determine the availability of the playback device specified in the digital media content request from a user interface;

the media management control accepting or rejecting the identified media in each user request based on rules of play for each playback device by applying at least three of the rules of play to the requested digital media at the location of the at least one playback device, the rules of play including;

maximum queue length;

priority play based on a rewards program;

no repeat interval for play of digital media by at least one of the same artist and the same media;

non-play of a new digital media request if the same media is already accepted in the queue;

determining if a requested digital media is available for play on the at least one playback device;

determining if a requested digital media is approved for the at least one playback device;

immediate forced play of a digital media request; and out of order play in response to special conditions;

accepting the requested digital media for play on the playback device if the requested digital media meets all of the at least three applied rules of play;

rejecting the requested digital media if the requested digital media does not meet all if the at least three rules of play for the at least one playback device; and if the request is accepted, initiating transmission of the selected digital media by the digital media processor to the at least one digital audio-visual playback device for play of the selected digital media by the digital audio-visual playback device.

\* \* \* \* \*